United States Patent
Trifu et al.

(10) Patent No.: US 11,130,895 B2
(45) Date of Patent: Sep. 28, 2021

(54) AEROGEL COMPOSITES HAVING THERMAL STORAGE CAPACITY

(71) Applicant: ASPEN AEROGELS,INC., Northborough, MA (US)

(72) Inventors: Roxana Trifu, Worcester, MA (US); Redouane Begag, Hudson, MA (US); George Gould, Mendon, MA (US); Shannon White, Bolton, MA (US)

(73) Assignee: Aspen Aerogels, Inc., Northborough, MA (US)

( * ) Notice: Subject to any disclaimer, the term of this patent is extended or adjusted under 35 U.S.C. 154(b) by 0 days.

(21) Appl. No.: 15/270,759

(22) Filed: Sep. 20, 2016

(65) Prior Publication Data

US 2018/0079944 A1 Mar. 22, 2018

(51) Int. Cl.
| | |
|---|---|
| *C09K 5/06* | (2006.01) |
| *C08J 9/28* | (2006.01) |
| *C08J 9/36* | (2006.01) |
| *C08K 5/01* | (2006.01) |
| *C08K 5/053* | (2006.01) |
| *C08K 3/16* | (2006.01) |
| *C08J 9/00* | (2006.01) |
| *C01B 33/158* | (2006.01) |
| *B32B 5/18* | (2006.01) |
| *C08J 9/42* | (2006.01) |

(52) U.S. Cl.
CPC ............... *C09K 5/063* (2013.01); *B32B 5/18* (2013.01); *C01B 33/1585* (2013.01); *C08J 9/0009* (2013.01); *C08J 9/0014* (2013.01); *C08J 9/0023* (2013.01); *C08J 9/0061* (2013.01); *C08J 9/0066* (2013.01); *C08J 9/0085* (2013.01); *C08J 9/286* (2013.01); *C08J 9/365* (2013.01); *C08K 3/16* (2013.01); *C08K 5/01* (2013.01); *C08K 5/053* (2013.01); *B32B 2266/102* (2016.11); *B32B 2266/126* (2016.11); *C08J 9/42* (2013.01); *C08J 2201/05* (2013.01); *C08J 2205/026* (2013.01); *C08J 2375/02* (2013.01); *C08J 2423/06* (2013.01); *C08J 2471/02* (2013.01); *C08K 2003/162* (2013.01); *Y10T 428/249953* (2015.04); *Y10T 428/249955* (2015.04)

(58) Field of Classification Search
CPC .... C08J 9/0009; C08J 2205/026; C09K 5/063
See application file for complete search history.

(56) References Cited

U.S. PATENT DOCUMENTS

| | | | |
|---|---|---|---|
| 4,498,459 A * | 2/1985 | Korin | F28D 20/02 126/618 |
| 4,572,864 A | 2/1986 | Benson et al. | |
| 4,708,812 A | 11/1987 | Hatfield | |
| 4,756,958 A | 7/1988 | Bryant et al. | |
| 4,908,238 A | 3/1990 | Vigo et al. | |
| 5,290,904 A | 3/1994 | Colvin et al. | |
| 5,456,852 A | 10/1995 | Isiguro | |
| 5,482,574 A | 1/1996 | Goldstein | |
| 5,552,075 A | 9/1996 | Salyer | |
| 6,185,742 B1 | 2/2001 | Doherty | |
| 6,207,738 B1 | 3/2001 | Zuckerman et al. | |
| 6,855,410 B2 | 2/2005 | Buckley | |
| 7,037,582 B2 | 5/2006 | Xing et al. | |
| 8,003,028 B2 | 9/2011 | Lawton | |
| 2001/0006865 A1 | 7/2001 | Holman | |
| 2006/0196568 A1 | 9/2006 | Leeser | |
| 2009/0029147 A1 * | 1/2009 | Tang | B32B 27/40 428/319.1 |
| 2011/0180751 A1 * | 7/2011 | Rein | C08B 1/003 252/182.12 |
| 2013/0344279 A1 * | 12/2013 | Doshi | E04B 1/7662 428/74 |

FOREIGN PATENT DOCUMENTS

| | | | |
|---|---|---|---|
| KR | 20100070917 A | * | 6/2010 |
| KR | 101492441 B1 | * | 2/2015 |

OTHER PUBLICATIONS

Huang et al., "Alkylated Phase Change Composites for Thermal Energy Storage Based on Surface-Modified Silica Aerogels," Journal of Materials Chemistry A, 2015, 3, 1935-1940. (Year: 2015).*
Xiangfa et al., "Preparation, Properties and Thermal Control Applications of Silica Aerogel Infiltrated with Solid-Liquid Phase Change Material," Journal of Experimental Nanoscience, vol. 7, No. 1, Jan.-Feb. 17-26, 2012. (Year: 2012).*
Translation of KR2010 0070917, Park et al., Jun. 28, 2010, p. 1-7. (Year: 2010).*
Translation of KR 101492441, Jeong-Geun Yu, Feb. 12, 2015. (Year: 2015).*
Huang, Xinyu, Nanoconfinement of phase change materials within carbon aerogels: phase transition behaviours and photo-to-thermal energy storage, J. Mater. Chem. A.; Dec. 21, 2014, 19963-19968, vol. 2, No. 47, Royal Society of Chemistry.
Zhang, H., Silica encapsulation of n-octadecane via sol-gel process: a novel microencapsulated phase-change material with enhanced thermal conductivity and performance, J Colloid Interface Sci. Mar. 1, 2010;343(1):246-55.

(Continued)

*Primary Examiner* — Hai Vo
(74) *Attorney, Agent, or Firm* — Christopher Stow; Poongunran Muthukumaran

(57) ABSTRACT

The present disclosure can provide aerogel compositions which have a thermal storage capacity, and which are durable and easy to handle. The present disclosure can provide aerogel compositions which include PCM coatings, particle mixtures, or PCM materials confined within the porous network of an aerogel composition. The present disclosure can provide methods for producing aerogel compositions by coating an aerogel composition with PCM materials, by forming particle mixtures with PCM materials, or by confining PCM materials within the porous network of an aerogel composition.

23 Claims, 1 Drawing Sheet

(56) References Cited

OTHER PUBLICATIONS

Wang, L.-Y., Preparation of silica microspheres encapsulating phase-change material by sol-gel method in O/W emulsion, Journal of Microencapsulation, 23:1, 3-14, 2006.

* cited by examiner

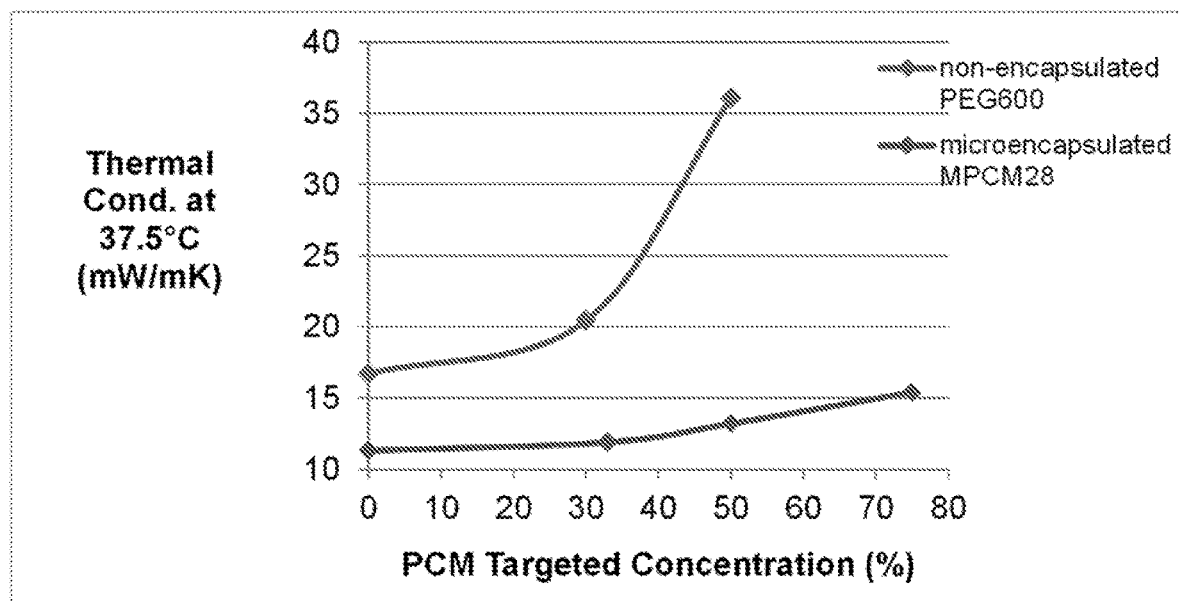

AEROGEL COMPOSITES HAVING THERMAL STORAGE CAPACITY

STATEMENT OF GOVERNMENT SUPPORT

This invention was made with Government support under Contract W9132T-11-C-0003 awarded by the U.S. Army Corps of Engineers Engineer Research and Development Center. The Government has certain rights in this invention.

BACKGROUND

Low-density aerogel materials are widely considered to be the best solid insulators available. Aerogels function as insulators primarily by minimizing conduction (low structural density results in tortuous path for energy transfer through the solid framework), convection (large pore volumes and very small pore sizes result in minimal convection), and radiation (IR absorbing or scattering dopants are readily dispersed throughout the aerogel matrix). Aerogels can be used in a broad range of applications, including: heating and cooling insulation, acoustics insulation, electronic dielectrics, aerospace, energy storage and production, and filtration. Furthermore, aerogel materials display many other interesting acoustic, optical, mechanical, and chemical properties that make them abundantly useful in various insulation and non-insulation applications.

SUMMARY OF THE INVENTION

In one general aspect, the present disclosure can provide aerogel compositions which have a thermal storage capacity, and which are durable and easy to handle. In certain embodiments, the aerogel compositions incorporate the thermal energy storage properties of PCMs.

In another general aspect, the present disclosure can provide aerogel compositions which incorporate the thermal energy storage properties of PCMs without significantly detracting from the superior insulating properties of aerogels. In certain embodiments, the thermal energy storage properties of PCMs are incorporated into aerogel compositions by forming composite compositions comprising aerogel and PCM materials. In certain embodiments, a coating composition comprising PCM materials is applied to at least one side of an aerogel composition. The PCM coating is coated onto one side of the aerogel composition, onto both sides of the aerogel composition, or sandwiched between multiple layers of aerogel material. In certain embodiments, aerogel particles are mixed with particles of PCM materials to produce an aerogel composite mixture. The aerogel/PCM composite particle mixture optionally includes a binder material. In certain embodiments, an aerogel/PCM composition is produced by confining the PCM materials within the porous network of an aerogel composition. The PCM material in the aerogel composite comprises 50 wt % or less of the total solids, 30 wt % or less of the total solids, 25 wt % or less of the total solids, 20 wt % or less of the total solids, or 15 wt % or less of the total solids. In certain embodiments, the aerogel composition comprises PCM materials confined within the porous network of an aerogel material, and the aerogel composition has a thermal conductivity of about 50 mW/m-K or less, about 40 mW/m-K or less, about 30 mW/m-K or less, about 25 mW/m-K or less, about 20 mW/m-K or less, about 18 mW/m-K or less, about 16 mW/m-K or less, about 14 mW/m-K or less or about 12 mW/m-K or less.

In another general aspect, the present disclosure can provide an aerogel composition which mitigates the complications related to the use of PCMs without significantly detracting from the superior thermal energy storage properties of PCMs. In certain embodiments, the complications related to the use of PCMs are mitigated by confining the PCM materials within the porous network of an aerogel material. In certain embodiments, the PCM materials are confined within the pores of a gel material by incorporating a PCM material into the sol-gel solution prior to gelation of the gel material. The present disclosure can provide a sol-gel solution comprising PCM materials which are dispersed, solubilized, or emulsified within the sol-gel solution. In certain embodiments, the sol-gel solution comprises silica gel precursor materials.

In another general aspect, the present disclosure can provide an aerogel compositions comprising aerogel and PCM materials which are coated with or confined within one or more layers of a barrier material which is impermeable to PCMs in fluid state, such as a foil or impermeable wrap material. In certain embodiments, an aerogel composition coated with PCM materials is covered on at least one side with a barrier material, such as a foil. In certain embodiments, an aerogel composition coated with PCM materials is encased within multiple layers of barrier material, such as a foil pouch. In certain embodiments, an aerogel composition comprising PCM materials confined within the porous network of the aerogel is covered on at least one side with a barrier material, such as a foil. In certain embodiments, an aerogel composition comprising PCM materials confined within the porous network of the aerogel is encased within multiple layers of barrier material, such as a foil pouch.

In another general aspect, the present disclosure can provide aerogel compositions comprising aerogel and PCM materials, and which also include a reflective coating or layer. In certain embodiments, an aerogel composition comprising PCM materials is coated with or confined within one or more layers of a reflective material, such as a foil. Inventors have discovered that reflective foils or coatings can significantly reduce the thermal conductivity of an aerogel/PCM composite within confined air gaps. The present disclosure can provide aerogel compositions comprising PCM and reflective elements which have thermal conductivities of about 15 mW/m-K or less, about 10 mW/m-K or less, or about 7 mW/m-K or less in the presence of air spacings of 4 inches or less, 2 inches or less, or 0.8 inches or less.

In another general aspect, the present disclosure can provide composite materials comprising aerogel and PCM material which are thermally stable for long durations of time. In certain embodiments, the aerogel/PCM composite material, when heated at 40° C. for 150 hours, has a weight loss of less than 10%, less than 5%, less than 2%, or less than 1%. In certain embodiments, the aerogel/PCM composite material loaded at 50 wt % PCM, when heated at 40° C. for 150 hours, has a weight loss of less than 10%, less than 5%, less than 2%, or less than 1%. In certain embodiments, the aerogel/PCM composite material loaded at 30 wt % PCM, when heated at 40° C. for 150 hours, has a weight loss of less than 10%, less than 5%, less than 2%, or less than 1%.

In another general aspect, the present disclosure can provide a method for producing aerogel compositions which have a thermal storage capacity, such as composite materials comprising aerogel and PCM material. In certain embodiments, a method for producing aerogel compositions which have a thermal storage capacity comprising: a) providing an aerogel composition, b) providing a coating material comprising a PCM material, and c) applying the coating material onto at least one surface of the aerogel composition. In certain embodiments, the aerogel composition is a reinforced aerogel composition. In certain embodiments, the aerogel composition is a reinforced aerogel composition which is reinforced by a fibrous reinforcement sheet or a foam reinforcement sheet. In certain embodiments, the method includes covering the PCM-coated aerogel composition with at least one layer of a barrier material, such as foil. In certain embodiments, the method includes covering the PCM-coated aerogel composition with at least one layer of a reflective material, such as foil.

In another general aspect, the present disclosure can provide a method for producing aerogel compositions which have a thermal storage capacity comprising: a) providing an aerogel composition comprising aerogel particles, b) providing a PCM material comprising particles of PCM materials, and c) mixing the aerogel particles with the particles of PCM materials to produce an aerogel composite mixture. In certain embodiments, the aerogel composite mixture further comprises a binder material. In certain embodiments, the method includes covering the aerogel/PCM composite material with at least one layer of a barrier material, such as foil. In certain embodiments, the method includes covering the aerogel/PCM composite material with at least one layer of a reflective material, such as foil.

In another general aspect, the present disclosure can provide a method for producing aerogel compositions which have a thermal storage capacity comprising: a) providing a sol-gel solution comprising gel precursor material and a solvent, b) incorporating PCM material into the sol-gel solution, c) allowing the gel precursor materials in the sol-gel solution to transition into a gel composition, and d) extracting at least a portion of the solvent from the gel composition to obtain an aerogel composition. In certain embodiments, the method includes heating or processing the PCM material before incorporation into the sol-gel solution to produce a PCM material which can be controllably dispersed, solubilized, or emulsified within the sol-gel solution. In certain embodiments, the method includes subjecting the PCM/sol-gel mixture to heat and/or mixing conditions after incorporation of the PCM material into the sol-gel solution to produce a solution of PCM material within the sol-gel solution. In certain embodiments, the method includes using a surfactant to emulsify the PCM material into the sol-gel solution. The emulsified PCM is subsequently confined within the porous network of the aerogel as an unencapsulated PCM, or as a PCM encapsulated by the surfactant material. In certain embodiments, the method includes covering the aerogel/PCM composite material with at least one layer of a barrier material, such as foil. In certain embodiments, the method includes covering the aerogel/PCM composite material with at least one layer of a reflective material, such as foil.

In another general aspect, the present disclosure can provide a method for producing aerogel compositions which have a thermal storage capacity comprises: a) providing a sol-gel solution comprising gel precursor material and a solvent, b) incorporating PCM material into the sol-gel solution, c) combining the precursor solution with a reinforcement material, d) allowing the gel precursor materials in the sol-gel solution to transition into a gel composition, and e) extracting at least a portion of the solvent from the gel composition to obtain an aerogel composition. In certain embodiments, the reinforcement material is a fibrous reinforcement sheet or a foam reinforcement sheet. In certain embodiments, the method includes covering the aerogel/PCM composite material with at least one layer of a barrier material, such as foil. In certain embodiments, the method includes covering the aerogel/PCM composite material with at least one layer of a reflective material, such as foil.

In another general aspect, the present disclosure can provide aerogel compositions produced by the methods described herein.

BRIEF DESCRIPTION OF THE DRAWINGS

FIG. 1 is a graph depicting the thermal conductivity measurements for examples of aerogel compositions of the present invention.

DETAILED DESCRIPTION

Thermal energy storage using the latent heat of materials, such as Phase Change Materials (PCMs), can delay or regulate temperature fluctuations in materials. This temperature regulation is achieved by the latent heat of material absorbing or releasing large amounts of heat during physical transformations, such as solid-liquid, liquid-gas, or solid-solid phase transitions. A need exists for the development of aerogel compositions which incorporate the thermal energy storage properties of PCMs into aerogels compositions without detracting from the superior insulating properties of aerogels.

There are a variety of complications related to the broad commercial use of PCMs, including flammability, low thermal conductivity, loss of phase-change capability, corrosion, degradation, and PCM leakage. A need therefore exists for the development of compositions which mitigate the complications related to the use of PCMs without detracting from the superior thermal energy storage properties of PCMs.

Aerogels can be difficult to produce due to the sensitive nature of their gel frameworks and pore networks, with a range of processing variables and conditions that must be carefully optimized and controlled to produce a functional aerogel material. Aerogels can also be extremely brittle, and difficult to handle and maintain. A need therefore exists for the development of reinforced aerogel compositions which are flexible, durable and easy to handle; which incorporate the thermal energy storage properties of PCMs into aerogels compositions without detracting from the superior insulating properties of aerogels; and which mitigate the complications related to the use of PCMs without detracting from the superior thermal energy storage properties of PCMs. A need also exists for methods which allow the favorable properties of PCMs to be incorporated into aerogels without interfering with the delicate conditions required to produce and maintain a functional aerogel material.

Aerogels are a class of porous materials with open-cells comprising a framework of interconnected structures, with a corresponding network of pores integrated within the framework, and an interstitial phase within the network of pores which is primarily comprised of gases such as air. Aerogels are typically characterized by a low density, a high porosity, a large surface area, and small pore sizes, Aerogels can be distinguished from other porous materials by their physical and structural properties.

Within the context of the present disclosure, the term "aerogel" or "aerogel material" refers to a gel comprising a framework of interconnected structures, with a corresponding network of interconnected pores integrated within the framework, and containing gases such as air as a dispersed interstitial medium; and which is characterized by the following physical and structural properties (according to Nitrogen Porosimetry Testing) attributable to aerogels: (a) an average pore diameter ranging from about 2 nm to about 100 nm, (b) a porosity of at least 80% or more, and (c) a surface area of about 20 m²/g or more.

Aerogel materials of the present disclosure thus include any aerogels or other open-celled compounds which satisfy the defining elements set forth in previous paragraphs; including compounds which can be otherwise categorized as xerogels, cryogels, ambigels, microporous materials, and the like.

Aerogel materials may also be further characterized by additional physical properties, including: (d) a pore volume of about 2.0 mL/g or more, preferably about 3.0 mL/g or more; (e) a density of about 0.50 g/cc or less, preferably about 0.25 g/cc or less; and (f) at least 50% of the total pore volume comprising pores having a pore diameter of between 2 and 50 nm; though satisfaction of these additional properties is not required for the characterization of a compound as an aerogel material.

Within the context of the present disclosure, the term "innovative processing and extraction techniques" refers to methods of replacing a liquid interstitial phase in a wet-gel material with a gas such as air, in a manner which causes low pore collapse and low shrinkage to the framework structure of the gel. Drying techniques, such as ambient pressure evaporation, often introduce strong capillary pressures and other mass transfer limitations at the liquid-vapor interface of the interstitial phase being evaporated or removed. The strong capillary forces generated by liquid evaporation or removal can cause significant pore shrinkage and framework collapse within the gel material. The use of innovative processing and extraction techniques during the extraction of a liquid interstitial phase reduces the negative effects of capillary forces on the pores and the framework of a gel during liquid phase extraction.

In certain embodiments, an innovative processing and extraction technique uses near critical or super critical fluids, or near critical or super critical conditions, to extract the liquid interstitial phase from a wet-gel material. This can be accomplished by removing the liquid interstitial phase from the gel near or above the critical point of the liquid or mixture of liquids. Co-solvents and solvent exchanges can be used to optimize the near critical or super critical fluid extraction process.

In certain embodiments, an innovative processing and extraction technique includes the modification of the gel framework to reduce the irreversible effects of capillary pressures and other mass transfer limitations at the liquid-vapor interface. This embodiment can include the treatment of a gel framework with a hydrophobizing agent, or other functionalizing agents, which allow a gel framework to withstand or recover from any collapsing forces during liquid phase extraction conducted below the critical point of the liquid interstitial phase. This embodiment can also include the incorporation of functional groups or framework elements which provide a framework modulus which is sufficiently high to withstand or recover from collapsing forces during liquid phase extraction conducted below the critical point of the liquid interstitial phase.

Within the context of the present disclosure, the terms "framework" or "framework structure" refer to the network of interconnected oligomers, polymers or colloidal particles that form the solid structure of a gel or an aerogel. The polymers or particles that make up the framework structures typically have a diameter of about 100 angstroms. However, framework structures of the present disclosure can also include networks of interconnected oligomers, polymers or colloidal particles of all diameter sizes that form the solid structure within in a gel or aerogel. Furthermore, the terms "silica-based aerogel" or "silica-based framework" refer to an aerogel framework in which silica comprises at least 50% (by weight) of the oligomers, polymers or colloidal particles that form the solid framework structure within in the gel or aerogel.

Within the context of the present disclosure, the term "aerogel composition" refers to any composite material which includes aerogel material as a component of the composite. Examples of aerogel compositions include, but are not limited to: fiber-reinforced aerogel composites; aerogel composites which include additive elements such as opacifiers; aerogel-foam composites; aerogel-polymer composites; and composite materials which incorporate aerogel particulates, particles, granules, beads, or powders into a solid or semi-solid material, such as binders, resins, cements, foams, polymers, or similar solid materials.

Within the context of the present invention, the term "monolithic" refers to aerogel materials in which a majority (by weight) of the aerogel included in the aerogel material or composition is in the form of a unitary interconnected aerogel nanostructure. Monolithic aerogel materials include aerogel materials which are initially formed to have a unitary interconnected gel or aerogel nanostructure, but which are subsequently cracked, fractured or segmented into non-unitary aerogel nanostructures. Monolithic aerogel materials are differentiated from particulate aerogel materials. The term "particulate aerogel material" refers to aerogel materials in which a majority (by weight) of the aerogel included in the aerogel material is in the form of particulates, particles, granules, beads, or powders, which can be combined or compressed together but which lack an interconnected aerogel nanostructure between individual particles.

Within the context of the present disclosure, the term "reinforced aerogel composition" refers to aerogel compositions which comprise a reinforcing phase within the aerogel material which is not part of the aerogel framework. The reinforcing phase can be any material which provides increased flexibility, resilience, conformability or structural stability to the aerogel material. Examples of well-known reinforcing materials include, but are not limited to: open-cell foam reinforcement materials, closed-cell foam reinforcement materials, open-cell membranes, honeycomb reinforcement materials, polymeric reinforcement materials, and fiber reinforcement materials such as discrete fibers, woven materials, non-woven materials, battings, webs, mats, and felts. Additionally, fiber based reinforcements may be combined with one or more of the other reinforcing materials, and can be oriented continuously throughout or in limited preferred parts of the composition.

Within the context of the present disclosure, the term "fiber-reinforced aerogel composition" refers to a reinforced aerogel composition which comprises a fiber reinforcement material as a reinforcing phase. Examples of fiber reinforcement materials include, but are not limited to, discrete fibers, woven materials, non-woven materials, battings, webs, mats, felts, or combinations thereof. Fiber reinforcement materials can comprise a range of materials, including, but not limited to: Polyesters, polyolefin terephthalates, poly (ethylene) naphthalate, polycarbonates (examples Rayon, Nylon), cotton, (e.g. lycra manufactured by DuPont), carbon (e.g. graphite), polyacrylonitriles (PAN), oxidized. PAN, uncarbonized heat treated PANs (such as those manufactured by SOL carbon), fiberglass based material (like S-glass, 901 glass, 902 glass, 475 glass, E-glass,) silica based fibers like quartz, (e.g. Quartzel manufactured by Saint-Gobain), Q-felt (manufactured by Johns Manville), Saffil (manufactured by Saffil), Durablanket (manufactured by Unifrax) and other silica fibers, Duraback (manufactured by Carborundum), Polyaramid fibers like Kevlar, Nomex, Sontera (all manufactured by DuPont), Conex (manufactured by Taijin), polyolefins like Tyvek (manufactured by DuPont), Dyneema (manufactured by DSM), Spectra (manufactured by Honeywell), other polypropylene fibers like Typar, Xavan (both manufactured by DuPont), fluoropolymers like PTFE with trade names as Teflon (manufactured by DuPont), Goretex (manufactured by W.L. GORE), Silicon carbide fibers like Nicalon (manufactured by COI Ceramics), ceramic fibers like Nextel (manufactured by 3M), Acrylic polymers, fibers of wool, silk, hemp, leather, suede, PBO—Zylon fibers (manufactured by Tyobo), Liquid crystal material like Vectan (manufactured by Hoechst), Cambrelle fiber (manufactured by DuPont), Polyurethanes, polyamaides, Wood fibers, Boron, Aluminum, Iron, Stainless Steel fibers and other thermoplastics like PEEK, PES, PEI, PEK, PPS.

Within the context of the present invention, the terms "aerogel blanket" or "aerogel blanket composition" refer to aerogel compositions reinforced with a continuous sheet of fiber reinforcement material. Aerogel blanket compositions can be differentiated from other fiber-reinforced aerogel composition which are reinforced with a non-continuous fiber network, such as separated agglomerates or clumps of fiber materials. Aerogel blanket compositions are particularly useful for applications requiring flexibility, since they are highly conformable and can be used like a blanket to cover surfaces of simple or complex geometry, while also retaining the excellent thermal insulation properties of aerogels. Aerogel blanket compositions and similar fiber-reinforced aerogel compositions are described in Published US patent application 2002/0094426 (paragraphs 12-16, 25-27, 38-58, 60-88), which is hereby incorporated by reference according to the individually cited sections and paragraphs.

Within the context of the present invention, the term "wet gel" refers to a gel in which the mobile interstitial phase within the network of interconnected pores is primarily comprised of a liquid phase such as a conventional solvent, liquefied gases such as liquid carbon dioxide, or a combination thereof. Aerogels typically require the initial production of a wet gel, followed by innovative processing and extraction to replace the mobile interstitial liquid phase in the gel with air. Examples of wet gels include, but are not limited to: alcogels, hydrogels, ketogels, carbonogels, and any other wet gels known to those in the art.

Within the context of the present invention, the terms "additive" or "additive element" refer to materials which can be added to an aerogel composition before, during, or after the production of the aerogel. Additives can be added to alter or improve desirable properties in an aerogel, or to counteract undesirable properties in an aerogel. Additives are typically added to an aerogel material either prior or during gelation. Examples of additives include, but are not limited to: microfibers, fillers, reinforcing agents, stabilizers, thickeners, elastic compounds, opacifiers, coloring or pigmentation compounds, radiation absorbing compounds, radiation reflecting compounds, corrosion inhibitors, thermally conductive components, phase change materials, pH adjustors, redox adjustors, HCN mitigators, off-gas mitigators, electrically conductive compounds, electrically dielectric compounds, magnetic compounds, radar blocking components, hardeners, anti-shrinking agents, and other aerogel additives known to those in the art. Other examples of additives include smoke suppressants and fire suppressants. Published US Pat. App. 20070272902 A1 (Paragraphs [0008] and [0010]-[0039]) includes teachings of smoke suppressants and fire suppressants, and is hereby incorporated by reference according to the individually cited paragraphs.

Within the context of the present invention, the terms "flexible" and "flexibility" refer to the ability of an aerogel material or composition to be bent or flexed without macrostructural failure. Preferably, aerogel materials or compositions of the present invention are capable of bending at least 5°, at least 25°, at least 45°, at least 65°, or at least 85° without macroscopic failure; and/or have a bending radius of less than 4 feet, less than 2 feet, less than 1 foot, less than 6 inches, less than 3 inches, less than 2 inches, less than 1 inch, or less than ½ inch without macroscopic failure. Likewise, the terms "highly flexible" or "high flexibility" refer to aerogel materials or compositions capable of bending to at least 90° and/or have a bending radius of less than ½ inch without macroscopic failure. Furthermore, the terms "classified flexible" and "classified as flexible" refer to aerogel materials or compositions which can be classified as flexible according to ASTM classification standard C1101 (ASTM International, West Conshohocken, Pa.).

Aerogel materials or compositions of the present invention can be flexible, highly flexible, and/or classified flexible. Aerogel materials or compositions of the present invention can also be drapable. Within the context of the present invention, the terms "drapable" and "drapability" refer to the ability of an aerogel material or composition to be bent or flexed to 90° or more with a radius of curvature of about 4 inches or less, without macroscopic failure. An aerogel material or composition of the present invention is preferably flexible such that the composition is non-rigid and may be applied and conformed to three-dimensional surfaces or objects, or pre-formed into a variety of shapes and configurations to simplify installation or application.

Within the context of the present invention, the terms "resilient" and "resilience" refer to the ability of an aerogel material or composition to at least partially return to an original form or dimension following deformation through compression, flexing, or bending. Resilience may be complete or partial, and it may be expressed in terms of percentage return. An aerogel material or composition of the present invention preferably has a resilience of more than 25%, more than 50%, more than 60%, more than 70%, more than 75%, more than 80%, more than 85%, more than 90%, or more than 95% return to an original form or dimension following a deformation. Likewise, the terms "classified resilient" and "classified as resilient" refer to aerogel materials or compositions which can be classified as resilient flexible according to ASTM classification standard C1101 (ASTM International, West Conshohocken, Pa.).

Within the context of the present invention, the term "self-supporting" refers to the ability of an aerogel material or composition to be flexible and/or resilient based primarily on the physical properties of the aerogel and any reinforcing phase in the aerogel composition. Self-supporting aerogel materials or compositions can be differentiated from other aerogel materials, such as coatings, which rely on an underlying substrate to provide flexibility and/or resilience to the material.

Within the context of the present invention, the term "shrinkage" refers to the ratio of: 1) the difference between the measured final density of the dried aerogel material or composition, or aerogel-like material or composition, and the target density calculated from solid content in the sol-gel precursor solution, relative to 2) the target density calculated from solid content in the sol-gel precursor solution. Shrinkage can be calculated by the following equation: Shrinkage= [Final Density (g/cm$^3$)−Target Density (g/cm$^3$)]/[Target Density (g/cm$^3$)]. Preferably, shrinkage of an aerogel material of the present invention is preferably 50% or less, 25% or less, 10% or less, 8% or less, 6% or less, 5% or less, 4% or less, 3% or less, 2% or less, 1% or less, 0.1% or less, about 0.01% or less, or in a range between any two of these values.

Within the context of the present disclosure, the terms "thermal conductivity" and "TC" refer to a measurement of the ability of a material or composition to transfer heat between two surfaces on either side of the material or composition, with a temperature difference between the two surfaces. Thermal conductivity is specifically measured as the heat energy transferred per unit time and per unit surface area, divided by the temperature difference. It is typically recorded in SI units as mW/m*K (milliwatts per meter * Kelvin). The thermal conductivity of a material may be determined by methods known in the art, including, but not limited to: Test Method for Steady-State Thermal Transmission Properties by Means of the Heat Flow Meter Apparatus (ASTM C518, ASTM International, West Conshohocken, Pa.); a Test Method for Steady-State Heat Flux Measurements and Thermal Transmission Properties by Means of the Guarded-Hot-Plate Apparatus (ASTM C177, ASTM International, West Conshohocken, Pa.); a Test Method for Steady-State Heat Transfer Properties of Pipe Insulation (ASTM C335, ASTM International, West Conshohocken, Pa.); a Thin Heater Thermal Conductivity Test (ASTM C1114, ASTM International, West Conshohocken, Pa.); Determination of thermal resistance by means of guarded hot plate and heat flow meter methods (EN 12667, British Standards Institution, United Kingdom); or Determination of steady-state thermal resistance and related properties—Guarded hot plate apparatus (ISO 8203, International Organization for Standardization, Switzerland). Within the context of the present disclosure, thermal conductivity measurements are acquired according to ASTM C177 standards, at a temperature of about 37.5° C. at atmospheric pressure, and a compression of about 2 psi, unless otherwise stated. Preferably, aerogel materials or compositions of the present disclosure have a thermal conductivity of about 50 mW/mK or less, about 40 mW/mK or less, about 30 mW/mK or less, about 25 mW/mK or less, about 20 mW/mK or less, about 18 mW/mK or less, about 16 mW/mK or less, about 14 mW/mK or less, about 12 mW/mK or less, about 10 mW/mK or less, about 5 mW/mK or less, or in a range between any two of these values.

Within the context of the present invention, the term "density" refers to a measurement of the mass per unit volume of an aerogel material or composition. The term "density" generally refers to the true density of an aerogel material, as well as the bulk density of an aerogel composition. Density is typically recorded as kg/m$^3$ or g/cc. The density of an aerogel material or composition may be determined by methods known in the art, including, but not limited to: Standard Test Method for Dimensions and Density of Preformed Block and Board—Type Thermal Insulation (ASTM C303, ASTM International, West Conshohocken, Pa.); Standard Test Methods for Thickness and Density of Blanket or Batt Thermal Insulations (ASTM C167, ASTM International, West Conshohocken, Pa.); or Determination of the apparent density of preformed pipe insulation (ISO 18098, International Organization for Standardization, Switzerland). Within the context of the present invention, density measurements are acquired according to ASTM C167 standards, unless otherwise stated. Preferably, aerogel materials or compositions of the present invention have a density of about 0.60 g/cc or less, about 0.50 g/cc or less, about 0.40 g/cc or less, about 0.30 g/cc or less, about 0.25 g/cc or less, about 0.20 g/cc or less, about 0.18 g/cc or less, about 0.16 g/cc or less, about 0.14 g/cc or less, about 0.12 g/cc or less, about 0.10 g/cc or less, about 0.05 g/cc or less, about 0.01 g/cc or less, or in a range between any two of these values.

Within the context of the present disclosure, the term "hydrophobicity" refers to a measurement of the ability of an aerogel material or composition to repel water.

Hydrophobicity of an aerogel material or composition can be expressed in terms of the liquid water uptake. Within the context of the present disclosure, the term "liquid water uptake" refers to a measurement of the potential of an aerogel material or composition to absorb or otherwise retain liquid water. Liquid water uptake can be expressed as a percent (by weight or by volume) of water which is absorbed or otherwise retained by an aerogel material or composition when exposed to liquid water under certain measurement conditions. The liquid water uptake of an aerogel material or composition may be determined by methods known in the art, including, but not limited to: Standard Test Method for Determining the Water Retention (Repellency) Characteristics of Fibrous Glass Insulation (ASTM C1511, ASTM International, West Conshohocken, P.); Standard Test Method for Water Absorption by Immersion of Thermal Insulation Materials (ASTM C1763, ASTM International, West Conshohocken, Pa.); Thermal insulating products for building applications: Determination of short term water absorption by partial immersion (EN 1609, British Standards Institution, United Kingdom). Within the context of the present disclosure, measurements of liquid water uptake are acquired according to ASTM C1511 standards, under ambient pressure and temperature, unless otherwise stated. Preferably, aerogel materials or compositions of the present disclosure can have a liquid water uptake of according to ASTM C1511 of about 100 wt % or less, about 80 wt % or less, about 60 wt % or less, about 50 wt % or less, about 40 wt % or less, about 30 wt % or less, about 20 wt % or less, about 15 wt % or less, about 10 wt % or less, about 8 wt % or less, about 3 wt % or less, about 2 wt % or less, about 1 wt % or less, about 0.1 wt % or less, or in a range between any two of these values. Aerogel materials or compositions of the present disclosure can have a liquid water uptake of according to ASTM C1763 of about 100 vol wt % or less, about 80 wt % or less, about 60 wt % or less, about 50 wt % or less, about 40 wt % or less, about 30 wt % or less, about 20 wt % or less, about 15 wt % or less, about 10 wt % or less, about 8 wt % or less, about 3 wt % or less, about 2 wt % or less, about 1 wt % or less, about 0.1 wt % or less, or in a range between any two of these values. An aerogel material or composition which has improved liquid water uptake relative to another aerogel material or composition will have a lower percentage of liquid water uptake/retention relative to the reference aerogel materials or compositions.

Hydrophobicity of an aerogel material or composition can be expressed in terms of the water vapor uptake. Within the context of the present disclosure, the term "water vapor uptake" refers to a measurement of the potential of an aerogel material or composition to absorb water vapor. Water vapor uptake can be expressed as a percent (by weight) of water which is absorbed or otherwise retained by an aerogel material or composition when exposed to water vapor under certain measurement conditions. The water vapor uptake of an aerogel material or composition may be determined by methods known in the art, including, but not limited to: Standard Test Method for Determining the Water Vapor Sorption of Unfaced Mineral Fiber Insulation (ASTM C1104, ASTM International, West Conshohocken, Pa.). Within the context of the present disclosure, measurements of water vapor uptake are acquired according to ASTM C1104 standards, under ambient pressure and temperature, unless otherwise stated. Preferably, aerogel materials or compositions of the present disclosure can have a water vapor uptake of about 50 wt % or less, about 40 wt % or less, about 30 wt % or less, about 20 wt % or less, about 15 wt % or less, about 10 wt % or less, about 8 wt % or less, about 3 wt % or less, about 2 wt % or less, about 1 wt % or less, about 0.1 wt % or less, or in a range between any two of these values. An aerogel material or composition which has improved water vapor uptake relative to another aerogel material or composition will have a lower percentage of water vapor uptake/retention relative to the reference aerogel materials or compositions.

Hydrophobicity of an aerogel material or composition can be expressed by measuring the equilibrium contact angle of a water droplet at the interface with the surface of the material. Aerogel materials or compositions of the present disclosure can have a water contact angle of about 90° or more, about 120° or more, about 130° or more, about 140° or more, about 150° or more, about 160° or more, about 170° or more, about 175° or more, or in a range between any two of these values.

Within the context of the present invention, the terms "latent heat" or "latent energy" refer to energy released or absorbed by a body or a thermodynamic system during a process while maintaining a substantially constant temperature. Within the context of the present invention, the terms "latent thermal storage capacity", "latent heat storage capacity", "latent thermal capacity", or "latent heat capacity" refer to the ability of a body or a thermodynamic system to absorb or release latent heat or latent energy while maintaining a substantially constant temperature.

Within the context of the present invention, the terms "Phase Change Material" or "PCM" refer to a material that can maintain a substantially constant temperature while absorbing or releasing energy in the form of latent heat through changes in phase (such as liquid-to-solid, solid-to-liquid, or solid-solid), hydration state, or crystalline structure (amorphous-to-crystal transitions). PCMs of the present invention can comprise organic materials, inorganic materials, eutectics, or mixtures thereof. PCMs of the present invention can comprise organic materials such as: paraffin/petroleum waxes; fatty acids and fatty acid esters (Palmitic acid, Capric acid, Caprylic acid, lauric acid, myristic acid, stearic acid); organic acids (lauric acid, myristic acid, palmitic acid, stearic acid); crystalline polymers (polyethylene glycol, PEG600, polyethylenes); carbohydrates (ribose, erythritol, mannitol, dulcitol, pentaerythritol); Naphthalenes; and mixtures thereof. PCMs of the present invention can comprise inorganic materials such as metals, inorganic salts, inorganic hydrated salts ($MgCl_2$—$6H_2O$, $Mg(NO_3)_2$—$6H_2O$, $Ba(OH)_2$—$8H_2O$, $CaCl_2$—$6H_2O$), and mixtures thereof. SavENRG™ PCM is one example of a commercially available PCM mixture comprising inorganic hydrated salts. PCMs of the present invention can be selected, mixed or optimized based on a range of desirable properties, including thermal conductivity, transition temperature range, latent heat absorption capacity, hygroscopic properties, and solvent solubility.

PCMs of the present invention can be in the form of particles, droplets, crystals, or pore coatings. PCM particles, droplets or crystals can be microencapsulated PCMs (3-100 μm), macroencapsulated PCMs (1-3 mm), or unencapsulated. In certain embodiments, the PCM material comprises particles, droplets or crystals which are microencapsulated or macroencapsulated. Examples of commercially-available micro-encapsulated PCMs include MPCM28 Microencapsulated Phase Change Material (paraffin based) sold by Microtek Laboratories, Inc., and PureTemp®24 Microcapsules sold by Entropy Solutions, Inc. Examples of commercially-available macro-encapsulated PCMs include Synpar™ macrocapsules sold by Syntroleum. Though microencapsulated phase change materials provide an effective way to contain and protect a PCM during phase changes, the process of microencapsulating the PCM can significantly increase the cost and complexity of producing the final aerogel composite. The encapsulation of the PCM can also complicate the gel formation and drying process, and significantly decrease the thermal conductivity and thermal storage performance of the PCM.

In a preferred embodiment of the present invention, the PCM material is unencapsulated. The unencapsulated PCM material can be in the form of pore coatings of PCM material, or can be in the form of particles, droplets or crystals which are confined within the pores of the gel or aerogel material. Preferred unencapsulated PCM material for use in the present invention include: paraffin/petroleum waxes; fatty acids such as palmitic acid, capric acid, caprylic acid, lauric acid, myristic acid, and stearic acid; organic acids such as lauric acid, myristic acid, palmitic acid, and stearic acid; glycerin; polyethylene glycols such as PEG600; and mixtures of inorganic hydrated salts which include calcium chloride.

Unencapsulated PCM materials can be conditioned or processed before incorporation into the gel material. The PCM materials can be exposed to heating, pressurization, solvation or other processing conditions to produce a PCM material which can be controllably dispersed, solubilized, or emulsified within a sol-gel solution. Unencapsulated PCM materials can also be subjected to heating, mixing, or other processing conditions after incorporation into a sol-gel solution to controllably disperse, solubilize, or emulsify the PCM materials within the solution. Processing the phase change materials can comprise heating, mixing, emulsification with a surfactant, surface functionalization, pH modification, molecular charge modification, hydration or dehydration.

Aerogels are described as a framework of interconnected structures which are most commonly comprised of interconnected oligomers, polymers or colloidal particles. An aerogel framework can be made from a range of precursor materials, including: inorganic precursor materials (such as precursors used in producing silica-based aerogels); organic precursor materials (such precursors used in producing carbon-based aerogels); hybrid inorganic/organic precursor materials; and combinations thereof. Within the context of the present invention, the term "amalgam aerogel" refers to an aerogel produced from a combination of two or more different gel precursors.

Inorganic aerogels are generally formed from metal oxide or metal alkoxide materials. The metal oxide or metal alkoxide materials can be based on oxides or alkoxides of any metal that can form oxides. Such metals include, but are not limited to: silicon, aluminum, titanium, zirconium, hafnium, yttrium, vanadium, cerium, and the like. Inorganic silica aerogels are traditionally made via the hydrolysis and condensation of silica-based alkoxides (such as tetraethoxylsilane), or via gelation of silicic acid or water glass. Other relevant inorganic precursor materials for silica based aerogel synthesis include, but are not limited to: metal silicates such as sodium silicate or potassium silicate, alkoxysilanes, partially hydrolyzed alkoxysilanes, tetraethoxylsilane (TEOS), partially hydrolyzed TEOS, condensed polymers of TEOS, tetramethoxylsilane (TMOS), partially hydrolyzed TMOS, condensed polymers of TMOS, tetra-n-propoxysilane, partially hydrolyzed and/or condensed polymers of tetra-n-propoxysilane, polyethyl silicates, partially hydrolyzed polyethysilicates, monomeric alkylalkoxy silanes, bis-trialkoxy alkyl or aryl silanes, polyhedral silsesquioxanes, or combinations thereof.

In certain embodiments of the present invention, pre-hydrolyzed TEOS, such as Silbond H-5 (SBHS, Silbond Corp), which is hydrolyzed with a water/silica ratio of about 1.9-2, may be used as commercially available or may be further hydrolyzed prior to incorporation into the gelling process. Partially hydrolyzed TEOS or TMOS, such as polyethysilicate (Silbond 40) or polymethylsilicate may also be used as commercially available or may be further hydrolyzed prior to incorporation into the gelling process.

Inorganic aerogels can also include gel precursors which comprise at least one hydrophobic group, such as alkyl metal alkoxides, cycloalkyl metal alkoxides, and aryl metal alkoxides, which can impart or improve certain properties in the gel such as stability and hydrophobicity. Inorganic silica aerogels can specifically include hydrophobic precursors such as alkylsilanes or arylsilanes. Hydrophobic gel precursors can be used as primary precursor materials to form the framework of a gel material. However, hydrophobic gel precursors are more commonly used as co-precursors in combination with simple metal alkoxides in the formation of amalgam aerogels. Hydrophobic inorganic precursor materials for silica based aerogel synthesis include, but are not limited to: trimethyl methoxysilane [TMS], dimethyl dimethoxysilane [DMS], methyl trimethoxysilane [MTMS], trimethyl ethoxysilane, dimethyl diethoxysilane [DMDS], methyl triethoxysilane [MTES], ethyl triethoxysilane [ETES], diethyl diethoxysilane, ethyl triethoxysilane, propyl trimethoxysilane, propyl triethoxysilane, phenyl trimethoxysilane, phenyl triethoxysilane [PhTES], hexamethyldisilazane and hexaethyldisilazane, and the like.

Aerogels may also be treated to impart or improve hydrophobicity. Hydrophobic treatment can be applied to a sol-gel solution, a wet-gel prior to liquid phase extraction, or to an aerogel subsequent to liquid phase extraction. Hydrophobic treatment is especially common in the production of metal oxide aerogels, such as silica aerogels. An example of a hydrophobic treatment of a gel is discussed below in greater detail, specifically in the context of treating a silica wet-gel. However, the specific examples and illustrations provided herein are not intended to limit the scope of the present invention to any specific type of hydrophobic treatment procedure or aerogel substrate. The present invention can include any gel or aerogel known to those in the art, as well as associated methods of hydrophobic treatment of the aerogels, in either wet-gel form or dried aerogel form.

Hydrophobic treatment is carried out by reacting a hydroxy moiety on a gel, such as a silanol group (Si—OH) present on a framework of a silica gel, with a functional group of a hydrophobizing agent. The resulting reaction converts the silanol group and the hydrophobizing agent into a hydrophobic group on the framework of the silica gel. The hydrophobizing agent compound can react with hydroxyl groups on the gel according the following reaction:

$R_NMX_{4-N}$ (hydrophobizing agent)+MOH (silanol)→MO-$MR_N$ (hydrophobic group)+HX. Hydrophobic treatment can take place both on the outer macro-surface of a silica gel, as well as on the inner-pore surfaces within the porous network of a gel.

A gel can be immersed in a mixture of a hydrophobizing agent and an optional hydrophobic-treatment solvent in which the hydrophobizing agent is soluble, and which is also miscible with the gel solvent in the wet-gel. A wide range of hydrophobic-treatment solvents can be used, including solvents such as methanol, ethanol, isopropanol, xylene, toluene, benzene, dimethylformamide, and hexane. Hydrophobizing agents in liquid or gaseous form may also be directly contacted with the gel to impart hydrophobicity.

The hydrophobic treatment process can include mixing or agitation to help the hydrophobizing agent to permeate the wet-gel. The hydrophobic treatment process can also include varying other conditions such as temperature and pH to further enhance and optimize the treatment reactions. After the reaction is completed, the wet-gel is washed to remove unreacted compounds and reaction by-products.

Hydrophobizing agents for hydrophobic treatment of an aerogel are generally compounds of the formula: $R_NMX_{4-N}$; where M is the metal; R is a hydrophobic group such as $CH_3$, $CH_2CH_3$, $C_6H_6$, or similar hydrophobic alkyl, cycloalkyl, or aryl moieties; and X is a halogen, usually Cl. Specific examples of hydrophobizing agents include, but are not limited to: trimethylchlorosilane [TMCS], triethylchlorosilane [TECS], triphenylchlorosilane [TPCS], dimethylchlorosilane [DMCS], dimethyldichlorosilane [DMDCS], and the like. Hydrophobizing agents can also be of the formula: $Y(R_3M)_2$; where M is a metal; Y is bridging group such as NH or O; and R is a hydrophobic group such as $CH_3$, $CH_2CH_3$, $C_6H_6$, or similar hydrophobic alkyl, cycloalkyl, or aryl moieites. Specific examples of such hydrophobizing agents include, but are not limited to: hexamethyldisilazane [HMDZ] and hexamethyldisiloxane [HMDSO]. Hydrophobizing agents can further include compounds of the formula: $R_NMV_{4-N}$, wherein V is a reactive or leaving group other than a halogen. Specific examples of such hydrophobizing agents include, but are not limited to: vinyltriethoxysilane and vinyltrimethoxysilane.

Organic aerogels are generally formed from carbon-based polymeric precursors. Such polymeric materials include, but are not limited to: resorcinol formaldehydes (RF), polyimide, polyacrylate, polymethyl methacrylate, acrylate oligomers, polyoxyalkylene, polyurethane, polyphenol, polybutadiene, trialkoxysilyl-terminated polydimethylsiloxane, polystyrene, polyacrylonitrile, polyfurfural, melamine-formaldehyde, cresol formaldehyde, phenol-furfural, polyether, polyol, polyisocyanate, polyhydroxybenze, polyvinyl alcohol dialdehyde, polycyanurates, polyacrylamides, various epoxies, agar, agarose, chitosan, and combinations thereof. As one example, organic RF aerogels are typically made from the sol-gel polymerization of resorcinol or melamine with formaldehyde under alkaline conditions.

Organic/inorganic hybrid aerogels are mainly comprised of ormosil (organically modified silica) aerogels. These ormosil materials include organic components which are covalently bonded to a silica network. Ormosils are typically formed through the hydrolysis and condensation of organically modified silanes, $R—Si(OX)_3$, with traditional alkoxide precursors, $Y(OX)_4$. In these formulas: X may represent, for example, $CH_3$, $C_2H_5$, $C_3H_7$, $C_4H_9$; Y may represent, for example, Si, Ti, Zr, or Al; and R may be any organic fragment such as methyl, ethyl, propyl, butyl, isopropyl, methacrylate, acrylate, vinyl, epoxide, and the like. The organic components in ormosil aerogel may also be dispersed throughout or chemically bonded to the silica network.

Within the context of the present invention, the term "ormosil" encompasses the foregoing materials as well as other organically modified ceramics, sometimes referred to as "ormocers." Ormosils are often used as coatings where an ormosil film is cast over a substrate material through, for example, the sol-gel process. Examples of other organic-inorganic hybrid aerogels of the invention include, but are not limited to, silica-polyether, silica-PMMA, silica-chitosan, carbides, nitrides, and other combinations of the aforementioned organic and inorganic aerogel forming compounds. Published US Pat. App. 20050192367 (Paragraphs [0022]-[0038] and [0044]-[0058]) includes teachings of such hybrid organic-inorganic materials, and is hereby incorporated by reference according to the individually cited sections and paragraphs.

Aerogels of the present invention are preferably inorganic silica aerogels formed primarily from alcohol solutions of hydrolyzed silicate esters formed from silicon alkoxides. However, the invention as a whole may be practiced with any other aerogel compositions known to those in the art, and is not limited to any one precursor material or amalgam mixture of precursor materials.

Production of an aerogel generally includes the following steps: i) formation of a sol-gel solution; ii) formation of a gel from the sol-gel solution; and iii) extracting the solvent from the gel materials through innovative processing and extraction, to obtain a dried aerogel material. This process is discussed below in greater detail, specifically in the context of forming inorganic aerogels such as silica aerogels. However, the specific examples and illustrations provided herein are not intended to limit the present invention to any specific type of aerogel and/or method of preparation. The present invention can include any aerogel formed by any associated method of preparation known to those in the art.

The first step in forming an inorganic aerogel is generally the formation of a sol-gel solution through hydrolysis and condensation of metal alkoxide precursors in an alcohol-based solvent. Major variables in the formation of inorganic aerogels include the type of alkoxide precursors included in the sol-gel solution, the nature of the solvent, the processing temperature and pH of the sol-gel solution (which may be altered by addition of an acid or a base), and precursor/solvent/water ratio within the sol-gel solution. Control of these variables in forming a sol-gel solution can permit control of the growth and aggregation of the gel framework during the subsequent transition of the gel material from the "sol" state to the "gel" state. While properties of the resulting aerogels are affected by the pH of the precursor solution and the molar ratio of the reactants, any pH and any molar ratios that permit the formation of gels may be used in the present disclosure.

A sol-gel solution is formed by combining at least one gelling precursor with a solvent. Suitable solvents for use in forming a sol-gel solution include lower alcohols with 1 to 6 carbon atoms, preferably 2 to 4, although other solvents can be used as known to those with skill in the art. Examples of useful solvents include, but are not limited to: methanol, ethanol, isopropanol, ethyl acetate, ethyl acetoacetate, acetone, dichloromethane, tetrahydrofuran, and the like. Multiple solvents can also be combined to achieve a desired level of dispersion or to optimize properties of the gel material. Selection of optimal solvents for the sol-gel and gel formation steps thus depends on the specific precursors, fillers and additives being incorporated into the sol-gel solution; as well as the target processing conditions for gelling and liquid phase extraction, and the desired properties of the final aerogel materials.

Water can also be present in the precursor-solvent solution. The water acts to hydrolyze the metal alkoxide precursors into metal hydroxide precursors. The hydrolysis reaction can be (using TEOS in ethanol solvent as an example): $Si(OC_2H_5)_4 + 4H_2O \rightarrow Si(OH)_4 + 4(C_2H_5OH)$. The resulting hydrolyzed metal hydroxide precursors remain suspended in the solvent solution in a "sol" state, either as individual molecules or as small polymerized (or oligomarized) colloidal clusters of molecules. For example, polymerization/condensation of the $Si(OH)_4$ precursors can occur as follows: $2\ Si(OH)_4 = (OH)_3Si-O-Si(OH)_3 + H_2O$. This polymerization can continue until colloidal clusters of polymerized (or oligomarized) $SiO_2$ (silica) molecules are formed.

Acids and bases can be incorporated into the sol-gel solution to control the pH of the solution, and to catalyze the hydrolysis and condensation reactions of the precursor materials. While any acid may be used to catalyze precursor reactions and to obtain a lower pH solution, preferable acids include: HCl, $H_2SO_4$, $H_3PO_4$, oxalic acid and acetic acid. Any base may likewise be used to catalyze precursor reactions and to obtain a higher pH solution, with a preferable base comprising $NH_4OH$.

The sol-gel solution can include additional co-gelling precursors, as well as filler materials and other additives. Filler materials and other additives may be dispensed in the sol-gel solution at any point before or during the formation of a gel. Filler materials and other additives may also be incorporated into the gel material after gelation through various techniques known to those in the art. Preferably, the sol-gel solution comprising the gelling precursors, solvents, catalysts, water, filler materials and other additives is a homogenous solution which is capable of effective gel formation under suitable conditions.

The gel composition can include a phase change material. The phase change material can be externally bonded to the gel composition. In certain embodiments, the phase change material can be incorporated into the gel composition as a coating on the surface of the composition before or after drying. In certain embodiments, particles of PCM material can be mixed with particles of gel material. The particle mixture can include a binder material.

The phase change material can also be confined in the porous network within the gel framework of the gel composition. In certain embodiments, the PCM material is infiltrated into the framework of the gel material after the gel-forming materials are transitioned into the gel material (post-gelation infiltration). Post-gelation infiltration can be conducted by using vacuum or high pressures to infiltrate and spread the PCM materials through the porous network of the gel. Post-gelation infiltration can also be completed by solvent exchange, in which solvents are used to spread the PCM materials through the porous network of the gel. Post-gelation infiltration of the PCM material can often result in damage to the framework and pore network of the gel material due to the pressurized forces required to confine PCM material into the pores of the gel material. Post-gelation infiltration can also provide poor homogenous dispersal of the PCM materials throughout the gel material, leading to inconsistent and unpredictable performance. Correspondingly, post-gelation infiltration can be subject to oversaturation of PCM materials within the gel network because large amounts of PCM are often required to provide homogenous dispersal of the PCM materials throughout the gel material. Post-gelation infiltration can also result in interporous agglomerates of PCM materials within the porous network of the gel, thus producing thermal bridges which can significantly reduce the thermal performance of the gel material. Post-gelation infiltration can also have limited effectiveness at nanoconfinement PCM materials into extremely small pores within the gel material, due to capillary and diffusion limitations related to materials flowing in and out of extremely small pores.

In a preferred embodiment, the PCM material is confined into the framework of the gel material as the gel-forming materials are transitioned into the gel material (in situ confinement). This method comprises adding a PCM material into the sol-gel solution either before or during the gel-forming stage of the gelation.

The PCM material can be heated or processed into a dispersible form before being incorporated into the sol-gel solution, thereby facilitating homogenous dispersal of the PCM within the sol-gel solution. This can include heating or processing the PCM material into a form which is soluble with the sol-gel solution. This can also include using a surfactant which facilitates emulsification of the PCM material into the sol-gel solution. The PCM/sol-gel mixture can also be subjected to heat or mixing after incorporation of the PCM material to produce a homogenous solution of PCM material within the sol-gel solution. The PCM/sol-gel mixture can also be subjected to heating or mixing conditions which produce a heterogeneous dispersal of PCM material within the gel material, such as a concentration of PCM materials near a gel surface.

Without being bound by theory, it is believed that the PCM particles/droplets/crystals which are dispersed, solubilized, or emulsified within the sol-gel solution are confined into the pores of the gel material as the gel framework is formed. This in situ confinement process can preclude the need for external PCM coatings, and can also preclude the need for post-gelation infiltration of PCMs into the gel material.

In situ confinement of the PCM material also provides for an easy method of nano-confining PCM materials into extremely small pores within the aerogel. Within the context of the present invention, the terms "nanoconfinement" or "nanoconfining" refer to the confinement of a material within pores that have a diameter of 50 nm or less.

Once a sol-gel solution has been formed and optimized, the gel-forming components in the sol-gel can be transitioned into a gel material. The process of transitioning gel-forming components into a gel material comprises an initial gel formation step wherein the gel solidifies up to the gel point of the gel material. The gel point of a gel material may be viewed as the point where the gelling solution exhibits resistance to flow and/or forms a substantially continuous polymeric framework throughout its volume. A range of gel-forming techniques are known to those in the art. Examples include, but are not limited to: maintaining the mixture in a quiescent state for a sufficient period of time; adjusting the pH of the solution; adjusting the temperature of the solution; directing a form of energy onto the mixture (ultraviolet, visible, infrared, microwave, ultrasound, particle radiation, electromagnetic); or a combination thereof.

The process of transitioning gel-forming components into a gel material can also include an aging step (also referred to as curing) prior to liquid phase extraction. Aging a gel material after it reaches its gel point can further strengthen the gel framework by increasing the number of cross-linkages within the network. The duration of gel aging can be adjusted to control various properties within the resulting aerogel material. This aging procedure can be useful in preventing potential volume loss and shrinkage during liquid phase extraction. Aging can involve: maintaining the gel (prior to extraction) at a quiescent state for an extended period; maintaining the gel at elevated temperatures; adding cross-linkage promoting compounds; or any combination thereof. The preferred temperatures for aging are usually between about 10° C. and about 100° C. The aging of a gel material typically continues up to the liquid phase extraction of the wet-gel material.

The time period for transitioning gel-forming materials into a gel material includes both the duration of the initial gel formation (from initiation of gelation up to the gel point), as well as the duration of any subsequent curing and aging of the gel material prior to liquid phase extraction (from the gel point up to the initiation of liquid phase extraction). The total time period for transitioning gel-forming materials into a gel material is typically between about 1 minute and several days, preferably about 30 hours or less, about 24 hours or less, about 15 hours or less, about 10 hours or less, about 6 hours or less, about 4 hours or less, about 2 hours or less, about 1 hour or less, about 30 minutes or less, or about 15 minutes or less.

The resulting gel material may be washed in a suitable secondary solvent to replace the primary reaction solvent present in the wet-gel. Such secondary solvents may be linear monohydric alcohols with 1 or more aliphatic carbon atoms, dihydric alcohols with 2 or more carbon atoms, branched alcohols, cyclic alcohols, alicyclic alcohols, aromatic alcohols, polyhydric alcohols, ethers, ketones, cyclic ethers or their derivative.

Once a gel material has been formed and processed, the liquid phase of the gel can then be at least partially extracted from the wet-gel using many extraction methods, including innovative processing and extraction techniques, to form an aerogel material. Liquid phase extraction, among other factors, plays an important role in engineering the characteristics of aerogels, such as porosity and density, as well as related properties such as thermal conductivity. Generally, aerogels are obtained when a liquid phase is extracted from a gel in a manner that causes low shrinkage to the porous network and framework of the wet gel.

Aerogels are commonly formed by removing the liquid mobile phase from the gel material at a temperature and pressure near or above the critical point of the liquid mobile phase. Once the critical point is reached (near critical) or surpassed (supercritical) (i.e pressure and temperature of the system is at or higher than the critical pressure and critical temperature respectively) a new supercritical phase appears in the fluid that is distinct from the liquid or vapor phase. The solvent can then be removed without introducing a liquid-vapor interface, capillary pressure, or any associated mass transfer limitations typically associated with liquid-vapor boundaries. Additionally, the supercritical phase is more miscible with organic solvents in general, thus having the capacity for better extraction. Co-solvents and solvent exchanges are also commonly used to optimize the supercritical fluid drying process.

If evaporation or extraction occurs below the supercritical point, strong capillary forces generated by liquid evaporation can cause shrinkage and pore collapse within the gel material. Maintaining the mobile phase near or above the critical pressure and temperature during the solvent extraction process reduces the negative effects of such capillary forces. In some embodiments of the present invention, the use of near-critical conditions just below the critical point of the solvent system may allow production of aerogel materials or compositions with sufficiently low shrinkage, thus producing a commercially viable end-product.

Several additional aerogel extraction techniques are known in the art, including a range of different approaches in the use of supercritical fluids in drying aerogels. For example, Kistler (J. Phys. Chem. (1932) 36: 52-64) describes a simple supercritical extraction process where the gel solvent is maintained above its critical pressure and temperature, thereby reducing evaporative capillary forces and maintaining the structural integrity of the gel network. U.S. Pat. No. 4,610,863 describes an extraction process where the gel solvent is exchanged with liquid carbon dioxide and subsequently extracted at conditions where carbon dioxide is in a supercritical state. U.S. Pat. No. 6,670,402 teaches extracting a liquid phase from a gel via rapid solvent exchange by injecting supercritical (rather than liquid) carbon dioxide into an extractor that has been pre-heated and pre-pressurized to substantially supercritical conditions or above, thereby producing aerogels. U.S. Pat. No. 5,962,539 describes a process for obtaining an aerogel from a polymeric material that is in the form a sol-gel in an organic solvent, by exchanging the organic solvent for a fluid having a critical temperature below a temperature of polymer decomposition, and supercritically extracting the fluid/sol-gel. U.S. Pat. No. 6,315,971 discloses a process for producing gel compositions comprising: drying a wet gel comprising gel solids and a drying agent to remove the drying agent under drying conditions sufficient to reduce shrinkage of the gel during drying. U.S. Pat. No. 5,420,168 describes a process whereby Resorcinol/Formaldehyde aerogels can be manufactured using a simple air drying procedure. U.S. Pat. No. 5,565,142 describes drying techniques in which the gel surface is modified to be stronger and more hydrophobic, such that the gel framework and pores can resist collapse during ambient drying or subcritical extraction. Other examples of extracting a liquid phase from aerogel materials can be found in U.S. Pat. Nos. 5,275,796 and 5,395,805.

One preferred embodiment of extracting a liquid phase from the wet-gel uses supercritical conditions of carbon dioxide, including, for example: first substantially exchanging the primary solvent present in the pore network of the gel with liquid carbon dioxide; and then heating the wet gel (typically in an autoclave) beyond the critical temperature of carbon dioxide (about 31.06° C.) and increasing the pressure of the system to a pressure greater than the critical pressure of carbon dioxide (about 1070 psig). The pressure around the gel material can be slightly fluctuated to facilitate removal of the supercritical carbon dioxide fluid from the gel. Carbon dioxide can be recirculated through the extraction system to facilitate the continual removal of the primary solvent from the wet gel. Finally, the temperature and pressure are slowly returned to ambient conditions to produce a dry aerogel material. Carbon dioxide can also be pre-processed into a supercritical state prior to being injected into an extraction chamber.

One example of an alternative method of forming an aerogel includes the acidification of basic metal oxide precursors (such as sodium silicate) in water to make a hydrogel. Salt by-products may be removed from the silicic acid precursor by ion-exchange and/or by washing subsequently formed gels with water. Removing the water from the pores of the gel can be performed via exchange with a polar organic solvent such as ethanol, methanol, or acetone. The liquid phase in the gel is then at least partially extracted using innovative processing and extraction techniques.

Another example of an alternative method of forming aerogels includes reducing the damaging capillary pressure forces at the solvent/pore interface by chemical modification of the matrix materials in their wet gel state via conversion of surface hydroxyl groups to hydrophobic trimethylsilylethers, thereby allowing for liquid phase extraction from the gel materials at temperatures and pressures below the critical point of the solvent.

Large-scale production of aerogel materials or compositions can be complicated by difficulties related to the continuous formation of gel materials on a large scale; as well as the difficulties related to liquid phase extraction from gel materials in large volumes using innovative processing and extraction techniques. Aerogel materials or compositions of the present disclosure are preferably accommodating to production on a large scale. In certain embodiments, gel materials of the present disclosure can be produced in large scale through a continuous casting and gelation process. In certain embodiments, aerogel materials or compositions of the present disclosure are produced in a large scale which requires the use of large scale extraction vessels. Large scale extraction vessels of the present disclosure can include extraction vessels which have a volume of about 0.1 $m^3$ or more, about 0.25 $m^3$ or more, about 0.5 $m^3$ or more, or about 0.75 $m^3$ or more.

Aerogel compositions of the present disclosure can have a thickness of 15 mm or less, 10 mm or less, 5 mm or less, 3 mm or less, 2 mm or less, or 1 mm or less.

The embodiments of the present invention can be practiced using any of the processing, extraction and treatment techniques discussed herein, as well as other processing, extraction and treatment techniques known to those in the art for producing aerogels, aerogel-like materials, and aerogel compositions as defined herein.

Aerogel compositions may be fiber-reinforced with various fiber reinforcement materials to achieve a more flexible, resilient and conformable composite product. The fiber reinforcement materials can be added to the gels at any point in the gelling process to produce a wet, fibrous gel composition. The wet gel composition may then be dried to produce a fiber-reinforced aerogel composition. Fiber reinforcement materials may be in the form of discrete fibers, woven materials, non-woven materials, battings, webs, mats, and felts. Fiber reinforcements can be made from organic fibrous materials, inorganic fibrous materials, or combinations thereof.

In a preferred embodiment, non-woven fiber reinforcement materials are incorporated into the aerogel composition as continuous sheet of interconnected or interlaced fiber reinforcement materials. The process comprises initially producing a continuous sheet of fiber reinforced gel by casting or impregnating a gel precursor solution into a continuous sheet of interconnected or interlaced fiber reinforcement materials. The liquid phase may then be at least partially extracted from the fiber-reinforced gel sheets to produce a sheet-like, fiber reinforced aerogel composition.

Aerogel composition can also include an opacifier to reduce the radiative component of heat transfer. At any point prior to gel formation, opacifying compounds or precursors thereof may be dispersed into the mixture comprising gel precursors. Examples of opacifying compounds include, but are not limited to: Boron Carbide [$B_4C$], Diatomite, Manganese ferrite, MnO, NiO, SnO, $Ag_2O$, $Bi_2O_3$, carbon black, titanium oxide, iron titanium oxide, zirconium silicate, zirconium oxide, iron (I) oxide, iron (III) oxide, manganese dioxide, iron titanium oxide (ilmenite), chromium oxide, carbides (such as SiC, TiC or WC), or mixtures thereof.

Examples of opacifying compound precursors include, but are not limited to: $TiOSO_4$ or $TiOCl_2$.

Aerogel compositions of the present invention can be coated with or confined within one or more layers of a barrier material which is impermeable to PCMs in fluid state, such as a foil or impermeable wrap material. These can include aerogel compositions coated with PCM materials which are covered on at least one side with a barrier material (such as a foil), or which are encased within multiple layers of barrier material (such as a foil pouch). These can also include aerogel composition comprising PCM materials confined within the porous network of the aerogel which are covered on at least one side with a barrier material (such as a foil), or which are encased within multiple layers of barrier material (such as a foil pouch)

Aerogel compositions of the present invention can be coated with or confined within one or more layers of a reflective coating or layer. Inventors have discovered that reflective foils or coatings can significantly reduce the thermal conductivity of an aerogel/PCM composite within confined air gaps. Aerogel compositions comprising PCM and reflective elements have thermal conductivities of about 15 mW/m-K or less, about 10 mW/m-K or less, or about 7 mW/m-K or less in the presence of air spacings of 4 inches or less, 2 inches or less, or 0.8 inches or less.

The aerogel materials and compositions of the present invention have been shown to be highly effective as insulation materials. However, application of the methods and materials of the present invention are not intended to be limited to applications related to insulation. The methods and materials of the present invention can be applied to any system or application which would benefit from the unique combination of properties or procedures provided by the materials and methods of the present invention.

The following examples provide various non-limiting embodiments and properties of the present invention.

EXAMPLE 1

A sheet of Spaceloft® aerogel insulation fabricated at Aspen Aerogels, Inc. was provided as the base aerogel composition for the coating. Formaldehyde-free encapsulated organic PCMs with a phase transition temperatures of 22-28° C. were mixed with flame retardant binders comprising fire retardant additives. The PCM/binder mixture was applied evenly over one surface of the Spaceloft® aerogel insulation sheet, and allowed to cure at room temperature. The resulting coated aerogel composite sheet had good coating adherence and flame resistance. The resulting material was designed to have a latent heat storage capacity of 34 Btu/ft².

EXAMPLE 2

MPCM28 Microencapsulated Phase Change Materials (paraffin based) were acquired from Microtek Laboratories, Inc. A silica-based sol-gel solution in ethanol was produced, and MPCM28 microcapsules were dispersed into the sol-gel solution by sonication at PCM loadings percentages between 10-75 wt %. The PCM/sol-gel mixtures were infiltrated into fiber batting coupons. The resulting materials were base-catalyzed with ammonia, allowed to gel at room temperature, and then surface functionalized with hexamethyldisilazane, a hydrophobizing agent. The gels were dried using supercritical carbon dioxide extraction.

EXAMPLE 3

Polymeric diisocyanate precursors such as poly-MDI were reacted with polyoxyethylene triamine in acetone solvent to form a polyurea-based organic sol-gel. Individual samples of the organic sol-gel were independently doped with the following unencapsulated PCM materials: a) organic glycerol; b) polyethylene glycol of molecular weight 600 (PEG600); and c) inorganic savENRG™ PCM 24P based on calcium chloride hexahydrate. Each PCM/sol-gel mixture was infiltrated into a fiber batting coupon. The resulting materials were catalyzed with tertiary amines and allowed to gel at room temperature. The materials were then aged in acetone solvent for several days. The aged gel was dried using supercritical carbon dioxide extraction at 1600 psi.

EXAMPLE 4

Hydrolyzed silica and alkylated silica precursors in ethanol solvent were mixed with the unencapsulated PEG600 in liquid phase. Two samples were prepared: a) target aerogel density of 0.18 g/cc, with PCM loading of 30% of total solids; and b) target aerogel density of 0.25 g/cc, with PCM loading of 50% of total solids. The PCM/sol-gel solutions were infiltrated into polyester fiber batting coupons. The fiber reinforced gel coupons were catalyzed with ammonia, gelled, aged in ethanol at 60° C., and then the solvent was removed by ambient pressure drying to produce hydrophobic aerogel composite materials.

EXAMPLE 5

Materials produced in Example 4 were tested for thermal stability of the PCM material. Sampled were tested by monitoring the weight of the coupons as the materials were heated at 40° C. for up to 160 hours over 10 heating/cooling cycles. Aerogel/PCM composites produced in example 4 showed a variable weight loss of less than 1% for up to 160 hours of hot/cold cycling.

EXAMPLE 6

Materials produced in Example 2 and Example 4 were tested for thermal conductivity performance relative to PCM target concentration. The materials were tested according to ASTMC-518 at 37.5° C. FIG. 1 shows thermal conductivity measurements for the selected samples from Examples 2 and 4.

The thermal conductivity results presented in FIG. 1 show thermal conductivity values between 17 and 20 mW/m-K for aerogel composites containing non-encapsulated PCM materials. FIG. 1 also shows a noticeable decline in thermal conductivity performance for aerogel materials with non-encapsulated PCM concentrations above 30%.

As used herein, the conjunction "and" is intended to be inclusive and the conjunction "or" is not intended to be exclusive unless otherwise indicated. For example, the phrase "or, alternatively" is intended to be exclusive.

The use of the terms "a", "an", "the", or similar referents in the context of describing the invention (especially in the context of the claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

As used herein, the term "about" refers to a degree of deviation typical for a particular property, composition, amount, value or parameter as identified; such as deviations based on experimental errors, measurement errors, approximation errors, calculation errors, standard deviations from a mean value, routine minor adjustments, and so forth.

Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as", "for example") provided herein, is intended merely to better illuminate the invention and does not pose a limitation on the scope of the invention unless otherwise claimed.

What is claimed:

1. An aerogel composition which has a latent thermal storage capacity, wherein
   the aerogel composition comprises a monolithic aerogel material, a fibrous reinforcing material, and an encapsulated phase change material,
   the monolithic aerogel material comprises a gel framework and a corresponding network of pores integrated within the gel framework,
   the encapsulated phase change material is nanoconfined within the network of pores within the monolithic aerogel material,
   the aerogel composition has a thermal conductivity of 25 mW/m-K or less at 37.5° C. and ambient pressure, and
   the encapsulated phase change material in the aerogel composition comprises 50 wt % or less of the total solids.

2. The aerogel composition of claim 1, wherein the encapsulated phase change material in the aerogel composite comprises 30 wt % or less of the total solids.

3. The aerogel composition of claim 1, wherein aerogel composition has a weight loss of less than 10% when heated at 40° C. for 150 hours.

4. The aerogel composition of claim 1, wherein the encapsulated phase change material is selected from the group consisting of: paraffins; petroleum waxes; fatty acids; fatty acid esters; organic acids; polyethylene glycol; polyethylenes; carbohydrates; naphthalenes; glycerin; metals, inorganic salts; inorganic hydrated salts; and combinations thereof.

5. The aerogel composition of claim 1, produced using a gel precursor solution comprising gel precursor materials and encapsulated phase change materials.

6. The aerogel composition of claim 5, wherein the encapsulated phase change materials are solubilized or emulsified within the precursor solution.

7. The aerogel composition of claim 6, wherein the encapsulated phase change material is selected from the group consisting of: paraffins; petroleum waxes; fatty acids; fatty acid esters; organic acids; polyethylene glycol; polyethylenes; carbohydrates; naphthalenes; glycerin; metals, inorganic salts; inorganic hydrated salts; and combinations thereof.

8. The aerogel composition of claim 1 prepared by a process comprising the steps of:
   a) providing a precursor solution comprising gel precursor materials and a solvent;
   b) incorporating an encapsulated phase change material into the precursor solution;
   c) providing a fibrous reinforcing material;
   d) allowing the gel precursor materials in the precursor solution to transition into a gel composition comprising a gel framework and a corresponding network of pores integrated within the gel framework, such that the encapsulated phase change material is confined within the network of pores within the gel composition;
   e) extracting at least a portion of the solvent from the gel composition to obtain an aerogel composition.

9. The aerogel composition of claim 8, wherein the process further comprises: incorporating a reinforcement material into the aerogel composition by combining the reinforcement material with the precursor solution either before or during the transition of the gel precursor materials in the precursor solution into the gel composition.

10. The aerogel composition of claim 9, wherein the process further comprises processing the encapsulated phase change material before, during, or after incorporation into the gel precursor solution, to produce a phase change material which can be dispersed within the gel precursor solution or within the gel composition.

11. The aerogel composition of claim 9, wherein processing the encapsulated phase change material comprises heating, mixing, emulsification with a surfactant, surface functionalization, pH modification, molecular charge modification, hydration or dehydration.

12. The aerogel composition of claim 9, wherein the encapsulated phase change material is selected from the group consisting of: paraffins; petroleum waxes; fatty acids; fatty acid esters; organic acids; polyethylene glycol; polyethylenes; carbohydrates; naphthalenes; glycerin; metals, inorganic salts; inorganic hydrated salts; and combinations thereof.

13. The aerogel composition of claim 1, wherein the aerogel material is confined within one or more layers of reflective material.

14. The aerogel composition of claim 1, wherein the monolithic aerogel material is coated with a coating material and the coating material comprises a phase change material.

15. The aerogel composition of claim 1, wherein the aerogel composition includes at least one outer layer of reflective material.

16. The aerogel composition of claim 1, wherein the aerogel material is confined within one or more layers of a barrier material.

17. The aerogel composition of claim 1, wherein the encapsulated phase change material is microencapsulated.

18. The aerogel composition of claim 1, wherein the encapsulated phase change material is macroencapsulated.

19. The aerogel composition of claim 1, wherein the aerogel composition includes $B_4C$, Diatomite, Manganese ferrite, MnO, NiO, SnO, $Ag_2O$, $Bi_2O_3$, TiC, WC, carbon black, titanium oxide, iron titanium oxide, zirconium silicate, zirconium oxide, iron (I) oxide, iron (III) oxide, manganese dioxide, iron titanium oxide (ilmenite), chromium oxide, silicon carbide or mixtures thereof.

20. The aerogel composition of claim 1, wherein the aerogel composition includes silicon carbide.

21. An article comprising one or more layers of barrier material and the aerogel composition of claim 1.

22. The article of claim 21, comprising a foil.

23. The article of claim 21, comprising a reflective layer.

* * * * *